United States Patent
Astigarraga et al.

(10) Patent No.: US 9,497,026 B2
(45) Date of Patent: *Nov. 15, 2016

(54) AUTHORIZING REMOVABLE MEDIUM ACCESS

(71) Applicant: International Business Machines Corporation, Armonk, NY (US)

(72) Inventors: Tara Astigarraga, Fairport, NY (US); Allen K Bates, Tucson, AZ (US); Louie A. Dickens, Tucson, AZ (US); Nils Haustein, Soergenloch (DE); Michael E. Starling, Oceanside, CA (US); Daniel J. Winarski, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,842

(22) Filed: May 20, 2015

(65) Prior Publication Data

US 2015/0270972 A1    Sep. 24, 2015

Related U.S. Application Data

(63) Continuation of application No. 13/744,012, filed on Jan. 17, 2013, now Pat. No. 9,092,633.

(51) Int. Cl.
| | |
|---|---|
| *G06F 11/30* | (2006.01) |
| *G06F 12/14* | (2006.01) |
| *H04L 9/32* | (2006.01) |
| *G06F 21/60* | (2013.01) |
| *G06F 21/62* | (2013.01) |
| *G11B 20/00* | (2006.01) |
| *H04L 9/08* | (2006.01) |
| *G06F 21/32* | (2013.01) |

(52) U.S. Cl.
CPC ............ *H04L 9/3231* (2013.01); *G06F 21/32* (2013.01); *G06F 21/602* (2013.01); *G06F 21/6209* (2013.01); *G11B 20/00217* (2013.01); *H04L 9/085* (2013.01); *H04L 9/0825* (2013.01)

(58) Field of Classification Search
CPC .............. G06F 21/30–21/32; G06F 60/6209; G11B 20/0094; G11B 20/0021–20/0026; H04L 9/085
USPC ........ 713/182–194; 726/2, 16, 26–30, 34–35
See application file for complete search history.

(56) References Cited

U.S. PATENT DOCUMENTS

| | | |
|---|---|---|
| 6,959,090 B1 | 10/2005 | Alve et al. |
| 7,773,465 B2 | 8/2010 | Goodman et al. |
| 7,818,587 B2 | 10/2010 | Drew et al. |
| 8,230,501 B2 | 7/2012 | Haustein et al. |
| 2003/0063000 A1 | 4/2003 | Grimm |
| 2003/0212709 A1 | 11/2003 | De Schrijver |
| 2006/0233358 A1 | 10/2006 | Pradhan et al. |
| 2007/0043958 A1 | 2/2007 | Sasaki |
| 2007/0296581 A1 | 12/2007 | Schnee et al. |
| 2008/0298642 A1 | 12/2008 | Meenen |
| 2010/0077483 A1 | 3/2010 | Stolfo et al. |
| 2011/0252243 A1 | 10/2011 | Brouwer et al. |
| 2012/0163590 A1 | 6/2012 | Lieber et al. |
| 2014/0140586 A1 | 5/2014 | Case |

*Primary Examiner* — Christopher Revak
*Assistant Examiner* — Vadim Savenkov
(74) *Attorney, Agent, or Firm* — Kunzler Law Group (57) ABSTRACT

For authorizing removable medium access, a reassembly module retrieves a medium portion of an encryption key from a removable medium. The encryption key encrypts encrypted data stored on the removable medium and includes a plurality of portions. The reassembly module further retrieves the user portion of the encryption key assigned to a user requesting the removable medium. The reassembly module reassembles the encryption key using at least the medium portion and the user portion of the plurality of portions. The decryption module decrypts the encrypted data with the reassembled encryption key.

20 Claims, 6 Drawing Sheets

| | User Info 235a | User ID 225a | User Portion 220a | Medium Approvals 245a | Baseline Biometic ID 250a |
|---|---|---|---|---|---|
| 230a | | | | | |
| 230b | User Info 235b | User ID 225b | User Portion 220b | Medium Approvals 245b | Baseline Biometic ID 250b |
| 230c | User Info 235c | User ID 225c | User Portion 220c | Medium Approvals 245c | Baseline Biometic ID 250c |

AUTHORIZING REMOVABLE MEDIUM ACCESS

CROSS-REFERENCE TO RELATED APPLICATIONS

This application is a continuation of and claims priority to U.S. patent application Ser. No. 13/744,012 entitled "AUTHORIZING REMOVABLE MEDIUM ACCESS" and filed on Jan. 17, 2013 for Tara Astigarraga, which is incorporated herein by reference.

BACKGROUND

1. Field

The subject matter disclosed herein relates to removable media and more particularly relates to authorizing removable media access.

2. Description of the Related Art

Removable media data may be encrypted to protect the data from unauthorized access. Strong encryption increases the protection. Regardless of how strong the encryption algorithm is, the encryption key itself needs to be protected.

BRIEF SUMMARY

A method for authorizing removable medium access is disclosed. A reassembly module retrieves a medium portion of an encryption key from a removable medium. The encryption key encrypts encrypted data stored on the removable medium and includes a plurality of portions. The reassembly module further retrieves the user portion of the encryption key assigned to a user requesting the removable medium. The reassembly module reassembles the encryption key using at least the medium portion and the user portion of the plurality of portions. The decryption module decrypts the encrypted data with the reassembled encryption key. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having executable code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the executable code may be stored and/or propagated on in one or more computer readable medium(s).

The computer readable medium may be a tangible computer readable storage medium storing the executable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray disc (BD), an optical storage device, a magnetic storage device, a holographic storage medium, a micromechanical storage device, or any suitable combination of the foregoing. In the context of this document, a computer readable storage medium may be any tangible medium that can contain, and/or store executable code for use by and/or in connection with an instruction execution system, apparatus, or device.

The computer readable medium may also be a computer readable signal medium. A computer readable signal medium may include a propagated data signal with executable code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport executable code for use by or in connection with an instruction execution system, apparatus, or device. Executable code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, executable code may be both propagated as an electro-magnetic signal through a fiber optic cable for execution by a processor and stored on RAM storage device for execution by the processor.

Executable code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by executable code. The executable code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The executable code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The executable code may also be loaded onto a computer, other programmable data processing apparatus, or other devices to cause a series of operational steps to be performed on the computer, other programmable apparatus or other devices to produce a computer implemented process such that the executable code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the executable code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and executable code.

The description of elements in each figure may refer to elements of proceeding figures. Like numbers refer to like elements in all figures, including alternate embodiments of like elements.

Figure 1:
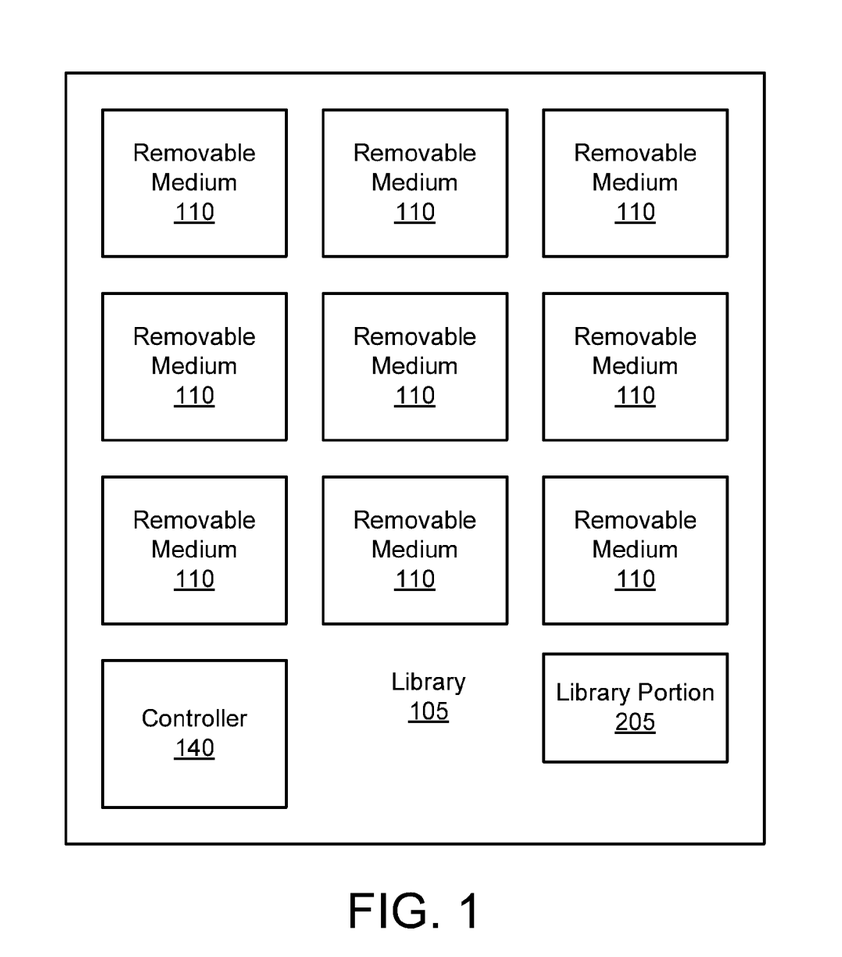
FIG. 1 is a schematic block diagram illustrating one embodiment of a library.

FIG. 1 is a schematic block diagram illustrating one embodiment of a library 105. The library 105 comprises a plurality of removable media 110. Each removable medium 110 may be a magnetic tape, a magnetic disk, a semiconductor solid-state medium such as a Solid-State-Drive (SSD), an optical storage medium, a holographic storage medium, and/or a micromechanical storage medium. The removable medium 110 stores data. The data may be encrypted with an encryption key. Library 105 may be a physical library in a computer room, such as the International Business Machines Corporation (IBM) Total Storage TS3500 produced by IBM of Armonk, N.Y., or may be a storage cloud which interfaces to physical removable media via the Internet.

The library 105 may also include a controller 140. The library 105 may store the removable media 110 in storage spaces such as slots, bins, and/or racks. The controller 140 may track the location of each removable medium 110 within the library 105. The library 105 may include an automated retrieval mechanism that retrieves a removable medium 110 for use under the direction of the controller 140. The automated retrieval mechanism may also place a removable medium 110 in a storage space after use.

In one embodiment, the library 105 provides a removable medium 110 to a drive for data I/O. The drive may be part of the library 105. The drive may access the data stored on the removable medium 110. Alternatively, the library 105 may provide the removable medium 110 to a user. The user may access the data of the removable medium 110 with a drive that is not part of the library 105. The embodiments described herein authorize access to a removable medium 110 so that the data of removable medium 110 does not fall into the wrong hands. Embodiments include securely generating an encryption key used to access encrypted data on the removable medium 110, and a library portion 205 of the encryption key residing in library 105. In addition, embodiments may further only provide access to the removable medium 110 to authorized users. In an alternate embodiment, removable media 110 is logically-partitioned, by either rows or columns in FIG. 1, so that users are limited to a particular partition and not the entire library.

Figure 2:
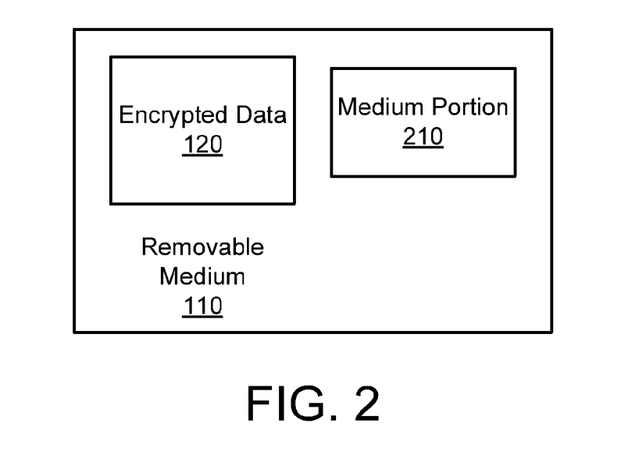
FIG. 2 is a schematic block diagram illustrating one embodiment of a removable medium.

FIG. 2 is a schematic block diagram illustrating one embodiment of the removable medium 110. The removable medium 110 includes encrypted data 120 and a medium portion 210 of the encryption key. The encryption key encrypts the encrypted data 120. In addition to the media portion 210, the encryption key may include additional portions as will be described hereafter. In one embodiment, the medium portion 210 is also encrypted.

The encryption key may be assembled from the medium portion 210 and other portions of the encryption key, such as the library portion 205. The assembled encryption key may be used to decrypt the encrypted data 120. Thus access to the removable medium 110 and the encrypted data 120 is only authorize enabled by reading each portion of the encryption key and reassembling the encryption key as will be described hereafter.

Figure 3:
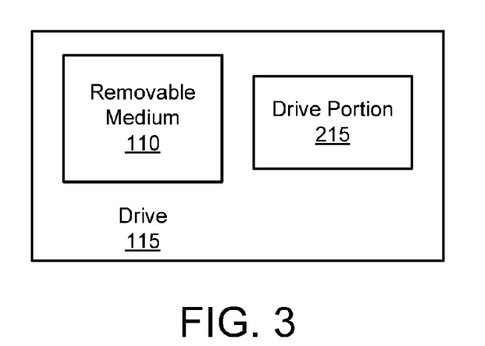
FIG. 3 is a schematic block diagram illustrating one embodiment of a drive.

FIG. 3 is a schematic block diagram illustrating one embodiment of a drive 115. The drive 115 may be a magnetic tape drive, a magnetic disk drive, a Solid-State-Drive (SSD) docking station, an optical disk drive, a holographic drive, a micromechanical drive, or the like. The automated retrieval mechanism may insert a removable medium 110 into the drive 115 so that the removable medium 110 may be accessed. Alternatively, a user may retrieve the removable medium 110 from the library 105 and insert the removable medium 110 into the drive 115.

In one embodiment, the drive 115 includes a drive portion 215 of the encryption key. The drive portion 215 may be retrieved from the drive 115 in order to reassemble the encryption key and decrypt the encrypted data 120 as will be described hereafter. In one embodiment, the library 105 and the drive 115 form an authorizing system.

Figure 4:
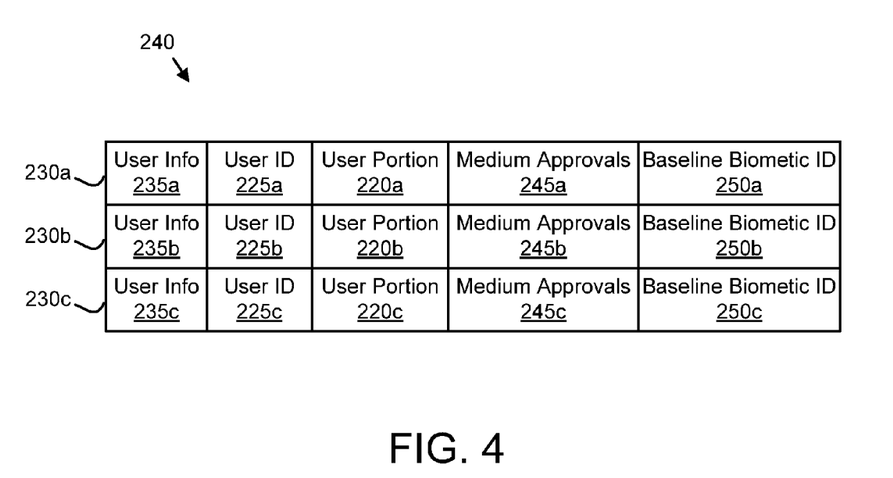
FIG. 4 is a schematic block diagram illustrating one embodiment of a user database.

FIG. 4 is a schematic block diagram illustrating one embodiment of a user database 240. The user data base 240 may include a plurality of entries 230. Each entry 230 may include information for a user. An entry 230 may authorize the user to access one or more storage media 110.

Each entry 230 may include user information 235, a user identifier 225, a user portion 220, media approvals 245, and a baseline biometric identifier 250. The user information 235 may be the user name, a user image, the user address, or combinations thereof. The user identifier 225 may be a number that uniquely identifies the user such as an employee number.

The user portion 220 is a portion of the encryption key. The user portion 220 may be a reassembled with other portions of the encryption key to form the assembled encryption key.

The medium approvals 245 may specify which storage media 110 may be accessed by the user. A user may only access storage media 110 for which he/she has medium approvals 245. In one embodiment, there is a user portion 220 for each storage media 110.

In one embodiment, the baseline biometric identifier 250 is a facial scan, a retinal scan, a fingerprint, or the like of the user. The baseline biometric identifier 250 may be recorded after positively identifying the user.

Figure 5:
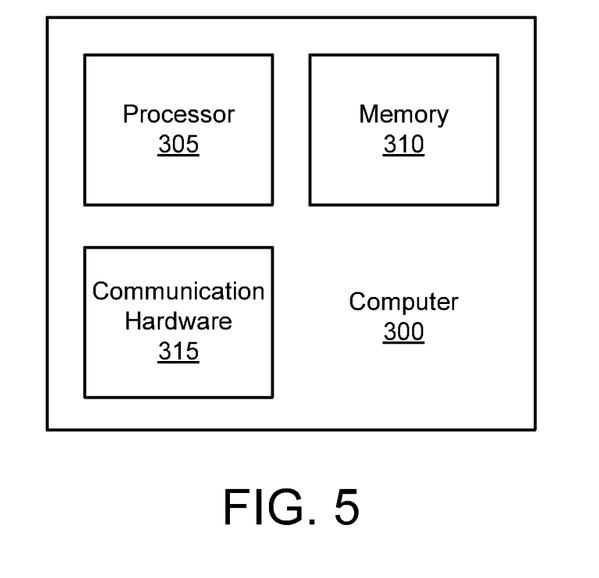
FIG. 5 is a schematic block diagram illustrating one embodiment of a computer.

FIG. 5 is a schematic block diagram illustrating one embodiment of a computer 300. The computer 300 may be the controller 140 of the library 105. Alternatively, the computer 300 may be embedded in the drive 115. In one embodiment, the computer 300 may decrypt the encrypted data 120 with the encryption key.

The computer 300 includes a processor 305, a memory 310, and communication hardware 315. The memory 310 may be a computer readable storage medium such as a semiconductor storage device, a hard disk drive, an optical drive, a holographic storage device, a micromechanical storage device, or combinations thereof. The memory 310 may store executable code. The processor 305 may execute the executable code. The communication hardware 315 may communicate with other devices.

Figure 6:
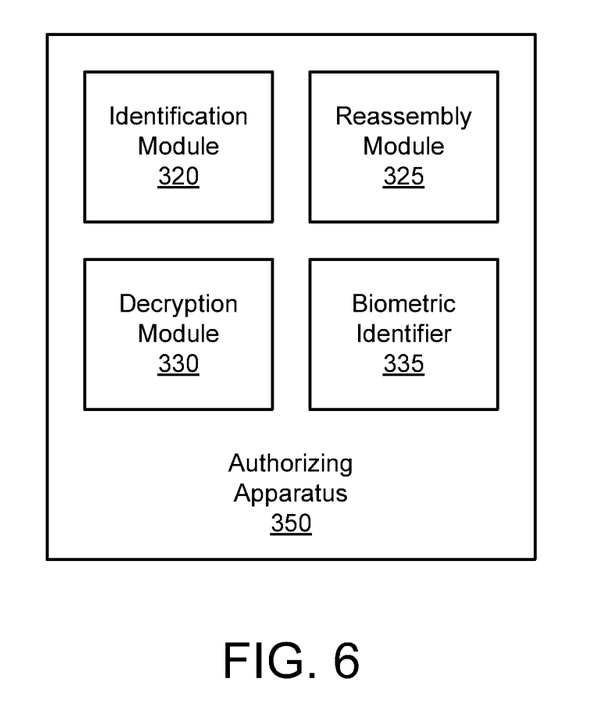
FIG. 6 is a schematic block diagram illustrating one embodiment of an authorizing apparatus.

FIG. 6 is a schematic block diagram illustrating one embodiment of an authorizing apparatus 350. The authorizing apparatus 350 may be embodied in the computer 300. The authorizing apparatus 350 includes an identification module 320, a reassembly module 325, and a decryption module 330. In one embodiment, the identification module 320, the reassembly module 325, and the decryption module 330 may be embodied in a computer-readable storage medium such as the memory 310 storing executable code.

The reassembly module 325 may retrieve the medium portion 210 of the encryption key from a removable medium 110. The reassembly module 325 may further retrieve the user portion 220 from the user data base 240. In addition, the reassembly module 325 may reassemble the encryption key using at least the medium portion 210 and the user portion 220. The decryption module 330 may decrypt the encrypted data 120 with the reassembled encryption key. The apparatus 350 may also include a biometric identifier 335 captured from the user.

Figure 7:
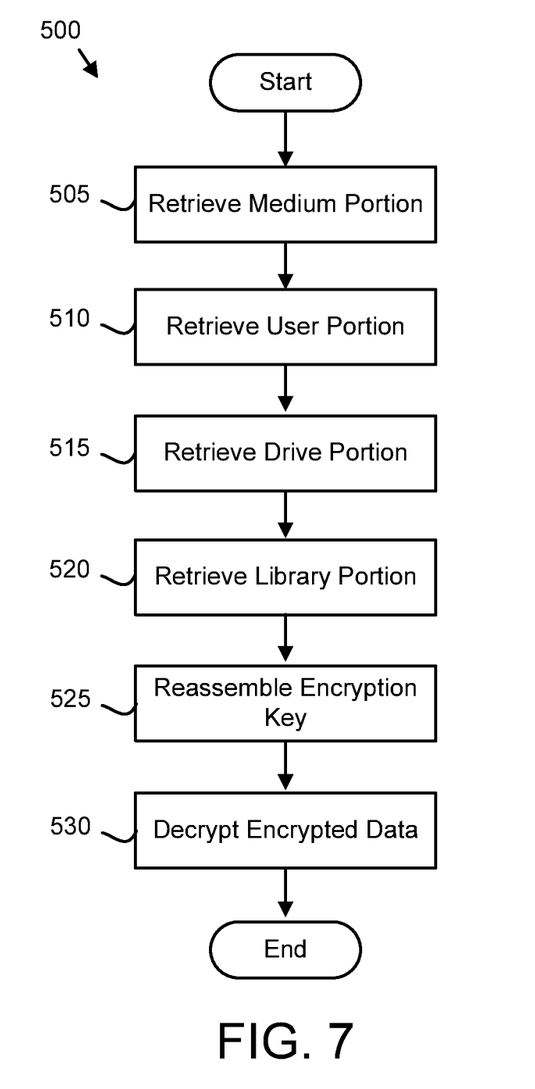
FIG. 7 is a schematic flow chart diagram illustrating one embodiment of an authorizing method.

FIG. 7 is a schematic flow chart diagram illustrating one embodiment of an authorizing method 500. The authorizing method 500 may perform the functions of the authorizing apparatus 350 and/or an authorizing system comprising the elements described herein. In one embodiment, the method 500 is performed by the processor 305. Alternatively, the method 500 may be performed by a computer readable storage medium such as the memory 310 storing executable code.

The method 500 starts, and in one embodiment the reassembly module 325 retrieves 505 the medium portion 210 of the encryption key from a removable medium 110. In one embodiment, the reassembly module 325 reads the medium portion 210 from the removable medium 110 using the drive 115. In addition, the reassembly module 325 may decrypt the medium portion 210 if the medium portion 210 is encrypted using a medium key.

The reassembly module 325 may further retrieve 510 the user portion 220 of the encryption key assigned to a user requesting the removable medium 110. In one embodiment, the reassembly module 325 receives the user identifier 225. The user may enter the user identifier 225 when requesting the removable medium 110. Alternatively, the user identifier 225 may be automatically appended to a request generated by the user. The user portion 220 may be retrieved from the user data base 240 using the user identify are 225.

In a certain embodiment, a biometric identifier is captured from the user and compared with the baseline biometric identifiers 250. The user portion 220 corresponding to the baseline biometric identifier 250 that matches the user's biometric identifier may be retrieved 510 by the reassembly module 325.

In one embodiment, the reassembly module 325 may retrieve 515 the drive portion 215 from the drive 115 reading the removable medium 110. The reassembly module 325 may further reassemble the encryption key using the drive portion 215. As a result, the encryption key may only be a reassembled if the removable medium 110 is accessed using the drive 115 with the required drive portion 215. Thus the removable medium 110 may be accessed from one or more authorized drives 115 that store the required drive portion 215, but not from other drives the lack the required drive portion 215.

The reassembly module 325 may retrieve 520 the library portion 205 from the library 105. The reassembly module 325 may identify the library 105 storing the removable medium 110. The reassembly module 325 may further retrieve 520 the library portion 205 from the library 105. In addition, the reassembly module 325 may reassemble the encryption key using the library portion 205.

In one embodiment, the library portion 205 may only be retrieved 520 if the removable medium 110 resides within the library 105. Thus the library portion 205 may not be obtained when the removable medium 110 is not controlled by the library 105, preventing unauthorized access to removable medium 110 that are taken from the library 105.

The reassembly module 325 may reassemble 525 the encryption key. In one embodiment, each portion constituting the encryption key maybe concatenated together in a specified order to reassemble 525 the encryption key. Alternatively, the encryption key may be a reassembled 525 according to an algorithm. For example, one bit of each portion may be added in turn to form the encryption key.

The decryption module 330 may decrypt 530 the encrypted data 120 from the removable medium 110 using the encryption key and the method 500 ends. One of skill in the art will recognize that embodiments may be practiced with one or more portions being used to reassemble the encryption key. For example, the encryption key may be reassembled using only the user portion 220 and the drive portion 215. Table 1 lists combinations of portions that may be employed to assemble the encryption key.

TABLE 1

| Combination |
| --- |
| Medium, User |
| Medium, Drive |
| Medium, Library |
| User, Drive |
| User, Library |
| Drive, Library |
| Medium, User, Library |
| Medium, User, Drive |

TABLE 1-continued

| Combination |
| --- |
| Medium, Drive, Library |
| Medium, User, Drive, Library |

By dividing portions of the encryption key among combinations of the library 105, the removable medium 110, the drive 115, and the user database 240, the protection of the encrypted data 120 is increased. The right combination of user, library 105, drive 115, and storage medium 110 are need to decrypt and access the encrypted data 120, making it difficult for an unauthorized user to access the encrypted data of the removable medium 110 from the library, or for an authorized user to remove the removable medium 110 for unauthorized access away from the library 105.

Figure 8A:
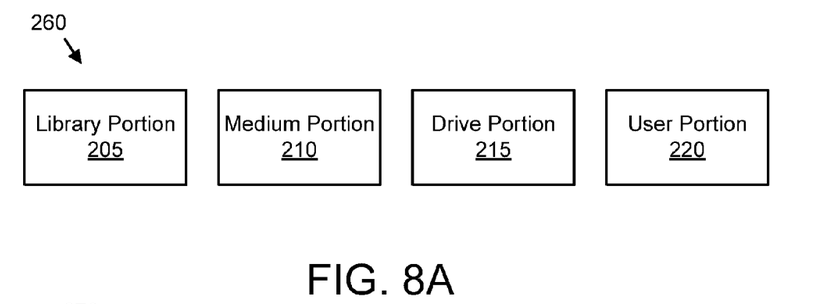
FIGS. 8A-C are schematic block diagrams illustrating encryption keys and encryption key portions.
Figure 8B:
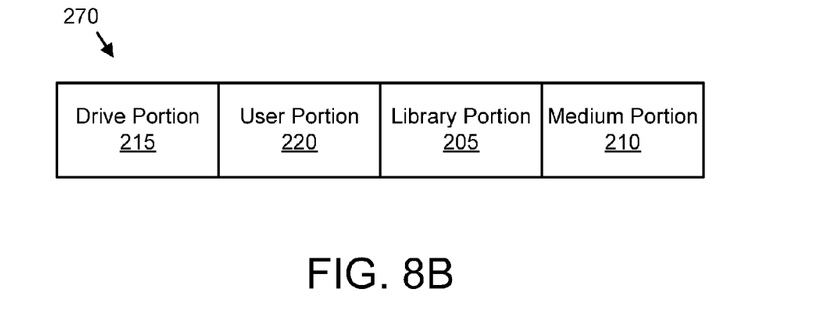
Figure 8C:
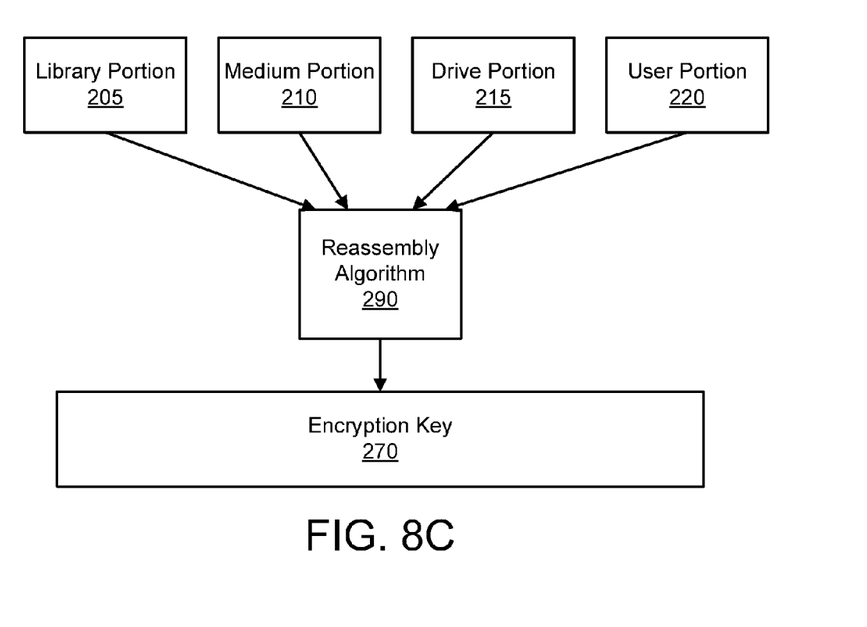

FIGS. 8A-C are schematic block diagrams illustrating encryption keys 270 and encryption key portions 260. FIG. 8A depicts retrieved portions 260 including the library portion 205, the medium portion 210, the drive portion 215, and the user portion 220.

FIG. 8B depicts the portions 260 concatenated together in a specified order to form the encryption key 270. Various combinations of the portions 260 may be used in one or more specified orders to form the encryption key 270.

In one embodiment, the portions 260 are selected to provide customized protection for removable media 110. For example, the library portion 205 and/or the drive portion 215 may be included in the encryption key 270 to assure that removable media 110 are not removed by authorized users and accessed in an unauthorized location or with unauthorized drives 215. Alternatively, the user portion 220 may be included in the encryption key 270 to assure that an unauthorized user does not access the removable media 110.

FIG. 8C depicts the use of a reassembly algorithm 290 to reassemble the library portion 205, the medium portion 210, the drive portion 215, and the user portion 220 into the encryption key 270. In one embodiment, specified logical and/or arithmetic functions are performed on the portions 260 in a specified order to form the encryption key 270. For example, the library portion 205, the medium portion 210, the drive portion 215, and the user portion 220 may each have the same number of digital bits. In addition, the portions 260 may be exclusive ORed (XOR) together to form the encryption key 270.

Figure 9:
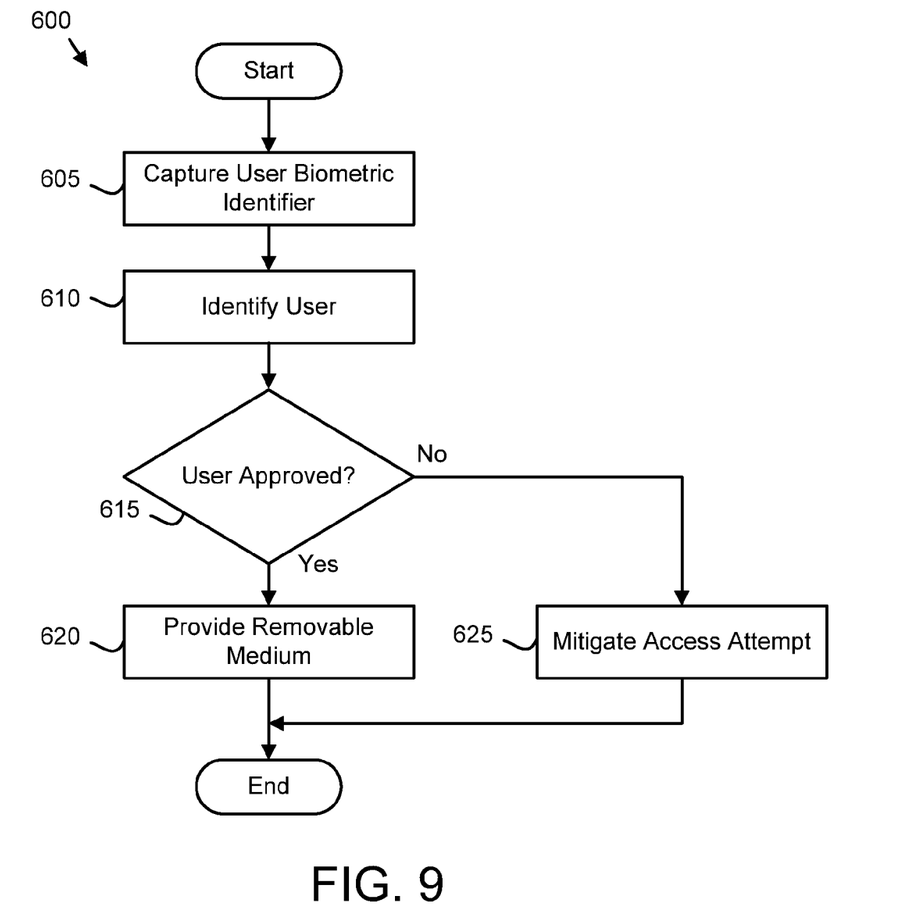
FIG. 9 is a schematic flow chart diagram illustrating one embodiment of an access method.

FIG. 9 is a schematic flow chart diagram illustrating one embodiment of an access method 600. The method 600 may perform the functions of the authorizing apparatus 350 and/or an authorizing system comprising the elements described herein. In one embodiment, the method 600 is performed by the processor 305. Alternatively, the method 600 may be performed by a computer readable storage medium such as the memory 310 storing executable code.

The method 600 starts, and in one embodiment, the identification module 320 captures 605 a biometric identifier 335 from a user. In one embodiment, the user's fingerprint is scanned as the biometric identifier 335. Alternatively, a retinal scan is taken of the user as the biometric identifier 335. In a certain embodiment, an image of the user's face is scanned as the biometric identifier 335.

The identification module 320 may further identify 610 the user from the biometric identifier 335. In one embodiment, the identification module 320 compares the biometric identifier 335 with one or more baseline biometric identifiers 250 from the user data base 240.

In one embodiment, the identification module 320 calculates a pixel-by-pixel difference between a biometric identifier 335 of the user and a baseline biometric identifier 250. The user biometric identifier 335 matches the baseline biometric identifier 250 if a specified number of standard deviations of the difference exceeds a standard deviation threshold.

In one embodiment, the identification module 320 calculates a difference between the biometric identifier 335 of the user with a filter matched to an impulse response of a baseline biometric identifier 250. The biometric identifier 335 matches the baseline biometric identifier 240 if a difference exceeds a filter threshold.

In a certain embodiment, the identification module 320 compares the biometric identifier 335 $g(x,y)$ to a filter matched to the impulse response $h(x,y)=s^*(-x,-y)$ of the baseline biometric identifier 250 $s(x,y)$ as shown in Equation 1, where $V(x,y)$ is the cross-correlation between the biometric identifier 335 $g(x,y)$ and the baseline biometric identifier 250 $s(x,y)$. Equation 1 calculates a double integral, meaning that the integration is over an X axis of the biometric identifier. Additionally, $\xi$ is the integration variable along a Y axis, $\eta$ is the integration variable along the Y axis, and * denotes a complex conjugate.

$$V(x,y)=\iint g(\xi,\eta)s^*(\xi-x,\eta-y)d\xi d\eta \qquad \text{Equation 1}$$

Mathematically, $V(x,y)$ is a surface varying along the X axis and the Y axis, for each $(x,y)$. There is one value of $V(x,y)$ for each pixel in the respective images. The range of $V(x,y)$ for each $(x,y)$ is between −1 and +1, where +1 represents the ideal correlation of one hundred (100%). To maximize $V(x,y)$, the following difference surface, Difference$(x,y)$, is defined in Equation 2, below. As shown, Difference$(x,y)$ is calculated by subtracting the matched filter correlation $V(x,y)$ from unity. Difference$(x,y)$ may be evaluated (a) point-to-point, (b) as an arithmetic mean, (c) as a geometric mean, and (d) as a root-mean-square. Difference $(x,y)$ ranges between 0 and +2, and the ideal difference for each value of $(x,y)$ is 0, meaning for a value of 0 that there is no difference between the new biometric identifier 335 and the baseline biometric identifier 250 at that point $(x,y)$. Difference$(x,y)$ may be evaluated point-by-point in read difference calculations, the surface Difference$(x,y)$ may be quantified in terms of a single number, to simply read difference calculations such as comparing against a decision-making threshold-value. Such single numbers may be MAX_Difference which is equal to the maximum value of Difference$(x,y)$. Alternately AM_Difference, the arithmetic mean of the values of Difference$(x,y)$, GM_Difference, the geometric mean of the values of Difference$(x,y)$, or RMS_Difference, the root-mean-square of the values of Difference $(x,y)$ may be used in the read difference calculations. $V(x,y)$, Difference$(x,y)$, MAX_Difference, AM_Difference, GM_Difference, and RMS_Difference may each be compared against a specified filter threshold. When that filter threshold is met, the biometric identifier 335 of the user is verified for cartridge access.

$$\text{Difference}(x,y)=1-V(x,y) \qquad \text{Equation 2}$$

SD_Difference is the standard deviation of the values of the Difference $(x,y)$. The SD_Difference may be used in combination with AM_Difference, for increased assurance that the biometric identifier 335 of the user is validated. For example, the threshold value may be tested against AM_Difference+N*SD_Difference. N=0 would mean just using the arithmetic mean, and would comprise 50% of the population of pixels meeting the threshold. N=1 would mean adding one standard deviation to the arithmetic mean and would comprise 84.13% of the population of pixels meeting the threshold. N=2 would mean adding two standard deviations to the arithmetic mean and would comprise 97.72% of the population of pixels meeting the threshold. N=3 would mean adding three standard deviations to the arithmetic mean and would comprise 99.865% of the population of pixels meeting the threshold. N=4 would mean adding four standard deviations to the arithmetic mean and would comprise 99.99683% of the population of pixels meeting the filter threshold.

The identification module 320 determines 615 if the identified user is approved to access the removable medium 110. In one embodiment, the baseline biometric identifier 250 is used as an index to access the medium approvals 245 for the user. If the medium approvals 245 include the removable medium 110, the user is approved, while if the medium approvals 245 do not include the removable medium 110, the user is not approved.

If the user is approved, the identification module 320 provides 620 the removable medium 110 to the user and the method 600 ends. In one embodiment, the removable medium 110 is provided 620 to the user by mounting the removable medium 110 in the drive 115. Alternatively, the removable medium 110 may be placed in a "mail" slot for pick up.

If the user is not approved, the identification module 320 may mitigate 625 the access attempt. In one embodiment, the identification module 320 mitigates the access attempt by not providing the removable medium 110 to the user. In addition, the identification module 320 may notify an administrator of the access attempt.

In one embodiment, the identification module 320 provides a placebo medium to the user. The placebo medium may be functionally identical to the removable medium 110. However the placebo medium may not include the data of the removable medium 110 such as the encrypted data 120. In one embodiment, the placebo medium includes a program and/or identifier. When the program and/or identifier are read from the placebo medium, a message may be sent to the library 105 with the details of the access of the placebo medium.

In one embodiment, the identification module 320 provides a tattle-tale medium to the user. The tattle-tale medium may appear to be functionally equivalent to the removable medium 110. However the tattle-tale medium may not store the data of the removable medium 110. In one embodiment, the tattle-tale medium includes a global positioning system (GPS) device that determines the position of the tattle-tale medium and a transmitter that communicates the position to the library 105.

The method 600 identifies the user and determines that the user is approved before providing the removable medium 110, preventing unapproved users from obtaining the removable medium 110. Thus an unapproved user possessing an authorized credential is still unable to obtain the removable medium 110.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for authorizing removable medium access comprising:
   providing, by use of a processor, a removable medium of a tape library to a user requesting the removable medium in response to identifying the user and determining that the user is approved to access the removable medium;
   mitigating an access attempt if the user is not approved, wherein mitigating the access attempt is selected from a group of actions comprising providing a placebo medium and providing a tattle-tale medium;
   retrieving a library portion of an encryption key from a library, the encryption key encrypting encrypted data stored on the removable medium and comprising a plurality of portions;
   retrieving a user portion of the encryption key assigned to a user requesting the removable medium in response to identifying the user and determining that the user is approved to access the removable medium;
   reassembling the encryption key using at least the library portion and the user portion of the plurality of portions; and
   decrypting the encrypted data with the reassembled encryption key.

2. The method of claim 1, further comprising:
   identifying the library of the removable medium;
   retrieving a medium portion of the encryption key from the removable medium; and
   reassembling the encryption key using the medium portion.

3. The method of claim 1, further comprising:
   retrieving a drive portion of the encryption key from a drive reading the removable medium; and
   reassembling the encryption key using the drive portion.

4. The method of claim 1, wherein the user is identified with a biometric identifier.

5. The method of claim 4, wherein the biometric identifier is selected from the group consisting of a facial scan, a retinal scan, and a fingerprint.

6. The method of claim 4, wherein the user is identified by calculating a difference between the user biometric identifier and a filter matched to an impulse response of a baseline biometric identifier, wherein the user biometric identifier matches the baseline biometric identifier if the difference exceeds a filter threshold.

7. The method of claim 4, wherein the user is identified by calculating a pixel-by-pixel difference between the user biometric identifier and a baseline biometric identifier, wherein the user biometric identifier matches the baseline biometric identifier if a specified number of standard deviations of the difference exceeds a standard deviation threshold.

8. The method of claim 1, wherein the group of actions further comprises not providing the removable medium and notifying an administrator.

9. An apparatus comprising:
   a processor;
   a non-transitory computer readable storage medium storing code executable by the processor to perform:
   providing a removable medium of a tape library to a user requesting the removable medium in response to identifying the user, determining that the user is approved to access the removable medium, and mitigating an access attempt if the user is not approved, wherein mitigating the access attempt is selected from a group of actions comprising providing a placebo medium and providing a tattle-tale medium;
   retrieving a library portion of an encryption key from a library, the encryption key encrypting encrypted data stored on the removable medium and comprising a plurality of portions, retrieving a user portion of the encryption key assigned to a user requesting the removable medium in response to identifying the user and determining that the user is approved to access the removable medium, and reassembling the encryption key using at least the library portion and the user portion of the plurality of portions; and
   decrypting the encrypted data with the reassembled encryption key, wherein at least a portion of the reassembly module and the decryption module comprise one or more of hardware and executable code, the executable code stored on one or more computer readable storage media.

10. The apparatus of claim 9, the processor further identifying the library of the removable medium, retrieving a medium portion of the encryption key from the removable medium, and reassembling the encryption key using the medium portion.

11. The apparatus of claim 9, the processor further retrieving a drive portion of the encryption key from a drive reading the removable medium and reassembling the encryption key using the drive portion.

12. The apparatus of claim 9, wherein the group of actions further comprises not providing the removable medium and notifying an administrator.

13. The apparatus of claim 9, wherein the user is identified by calculating a difference between a user biometric identifier and a filter matched to an impulse response of a baseline biometric identifier, wherein the user biometric identifier matches the baseline biometric identifier if the difference exceeds a filter threshold.

14. The apparatus of claim 9, wherein the user is identified by calculating a pixel-by-pixel difference between a user biometric identifier and a baseline biometric identifier, wherein the user biometric identifier matches the baseline biometric identifier if a specified number of standard deviations of the difference exceeds a standard deviation threshold.

15. A computer program product for authorizing removable medium access, the computer program product comprising a non-transitory computer readable storage medium having executable code embodied therein, the executable code readable/executable by a processor to:
   provide a removable medium of a tape library to a user requesting the removable medium in response to identifying the user and determining that the user is approved to access the removable medium;
   mitigate an access attempt if the user is not approved, wherein mitigating the access attempt is selected from a group of actions comprising providing a placebo medium and providing a tattle-tale medium;
   retrieve a library portion of an encryption key from a library, the encryption key encrypting encrypted data stored on the removable medium and comprising a plurality of portions;
   retrieve a user portion of the encryption key assigned to a user requesting the removable medium in response to identifying the user and determining that the user is approved to access the removable medium;
   reassemble the encryption key using at least the library portion and the user portion of the plurality of portions; and decrypt the encrypted data with the reassembled encryption key.

16. The computer program product of claim 15, the executable code further:
    identifying the library of the removable medium;
    retrieving a medium portion of the encryption key from the removable medium; and
    reassembling the encryption key using the medium portion.

17. The computer program product of claim 15, the executable code further:
    retrieving a drive portion of the encryption key from a drive reading the removable medium; and
    reassembling the encryption key using the drive portion.

18. The computer program product of claim 15, wherein the group of actions further comprises not providing the removable medium and notifying an administrator.

19. The computer program product of claim 15, wherein the user is identified by calculating a difference between a user biometric identifier and a filter matched to an impulse response of a baseline biometric identifier, wherein the user biometric identifier matches the baseline biometric identifier if the difference exceeds a filter threshold.

20. The computer program product of claim 15, wherein the user is identified by calculating a pixel-by-pixel difference between a user biometric identifier and a baseline biometric identifier, wherein the user biometric identifier matches the baseline biometric identifier if a specified number of standard deviations of the difference exceeds a standard deviation threshold.

\* \* \* \* \*